United States Patent [19]

Tani et al.

[11] Patent Number: 5,199,058
[45] Date of Patent: Mar. 30, 1993

[54] X-RAY MONOCHROMATOR AND SPECTRAL MEASUREMENT APPARATUS USING THE X-RAY MONOCHROMATOR

[75] Inventors: Katsuhiko Tani, Tokyo; Eriko Chiba, Kawasaki, all of Japan

[73] Assignee: Ricoh Company, Ltd., Tokyo, Japan

[21] Appl. No.: 808,627

[22] Filed: Dec. 17, 1991

[30] Foreign Application Priority Data

Dec. 17, 1990 [JP] Japan .................................. 2-411119
Feb. 18, 1991 [JP] Japan .................................. 3-46143

[51] Int. Cl.⁵ .............................................. G01T 1/36
[52] U.S. Cl. ........................................ 378/82; 378/84; 378/85
[58] Field of Search .............................. 378/82, 84, 85

[56] References Cited

U.S. PATENT DOCUMENTS 5,008,908 4/1991 Jack et al. .................... 378/84
5,016,267 5/1991 Wilkins .......................... 378/84

Primary Examiner—David P. Porta
Attorney, Agent, or Firm—Oblon, Spivak, McClelland, Maier & Neustadt

[57] ABSTRACT

An x-ray monochromator is composed of a semiconductor perfect single crystal serving as a monochromator and a solid state detector for measuring and/or counting the incident x-ray photons of an x-ray beam which enters the semiconductor single crystal, the solid state detector being disposed integrally with the semiconductor perfect single crystal on a side opposite to an x-ray beam incident side thereof. A spectral measurement apparatus for measuring the structure of a specimen with application of an x-ray beam and measuring the absorption of the x-ray beam by the specimen or the reflection of the ray-ray beam from the specimen is composed of a first x-ray monochromator including a U-shaped perfect single crystal, at least one second x-ray monochromator, which is identical to the above mentioned x-ray monochromator, a first driving device for rotating the first x-ray monochromator, a second driving device for rotating the second x-ray monochromator, and a control device for differentiating signals from the solid state detector, and controlling the second driving means to locate the second x-ray monochromator at a rotated position where the differential coefficient obtained by the differentiation changes from a positive value to a negative value, and the intensity of the x-ray beam which enters second x-ray monochromator is maximized.

19 Claims, 4 Drawing Sheets

X-RAY MONOCHROMATOR AND SPECTRAL MEASUREMENT APPARATUS USING THE X-RAY MONOCHROMATOR

BACKGROUND OF THE INVENTION

1. Field of the Invention

The present invention relates to an x-ray monochromator for producing a monochromatic and highly nondivergent x-ray beam and a spectral measurement apparatus using the x-ray monochromator.

2. Discussion of Background

An x-ray monochromator is for producing a monochromatic x-ray beam by subjecting an incident x-ray to Bragg reflection. Perfect crystals such as single crystals of Si and Ge are used in such an x-ray monochromator. One x-ray monochromator is composed of a single monochromator-crystal which utilizes one reflection from the surface thereof, and another x-ray monochromator is composed of, for instance, a channel-cut type monochromator-crystal which is made from a single piece of crystal including a U-shaped inner groove, and utilizes two reflections from the inner flat walls of the groove.

In order to improve the energy resolution of such an x-ray monochromator, the provision of a monochromator comprising two monochromator-crystals to an x-ray diffractometer has been proposed as a filter for obtaining a particular incident x-ray beam.

Recently a number of devices provided with a substrate and a thin single crystal layer formed thereon have been utilized and the number is increasing. A thin-film measurement method using a XANEs measurement or total reflection is most suitable for the nondestructive structural analysis of such a thin single crystal layer and for in situ inspection of the thin single crystal layer.

However a conventional thin-film measurement method using the monochromator including a pair of monochromator-crystals, have the shortcoming that manual adjustment of the spatial relationship between the two monchromator-crystals is partially restricted, so that it is extremely difficult to adjust the configuration and posture of each monochromator-crystal and to obtain a sufficiently high precision of the relative positional configuration when the two monochromator-crystals are merely rotated in synchronism with the rotation of their rotary axes.

Furthermore, a conventional thin-film measurement method using a single monochromator-crystal by the XANES measurement method or total reflection method does not provide a sufficient resolution for use in practice. When the channel-cut type monochromator-crystal is employed in these measurement methods, a slit must be employed in order to obtain the high energy resolution which is necessary for use in practice. However the use of the slit not only decreases the intensity of the x-ray flux obtained, but also cannot improve the angular divergency of the x-ray beam.

SUMMARY OF THE INVENTION

It is therefore a first object of the present invention to provide an x-ray monochromator using a semiconductor single crystal for producing a monochromatic x-ray photon flux, which is capable of attaining high energy resolution without reducing the intensity of the x-ray photon flux, and in which the configuration or posture of the semiconductor single crystal can be easily adjusted.

A second object of the present invention is to provide a spectral measurement apparatus for measuring the spectral from a specimen to analyze the thin layer structure of the specimen, with high resolution, which is suitable for the application of the XANES measurement method or total reflection method.

The first object of the present invention is achieved by an x-ray monochromator comprising a semiconductor perfect single crystal serving as a monochromator and a solid state detector for measuring and/or counting the incident x-ray photons of an x-ray beam which enters the semiconductor single crystal, the solid state detector being disposed integrally with the semiconductor perfect single crystal on a side opposite to an x-ray beam incident side thereof.

The second object of the present invention is achieved by a spectral measurement apparatus for measuring the structure of a specimen with application of an x-ray beam and measuring the absorption of the x-ray beam by the specimen or the reflection of the x-ray beam from the specimen comprising (a) a first x-ray monochromator comprising a U-shaped perfect single crystal, (b) at least one second x-ray monochromator, which is identical to the first mentioned x-ray monochromator comprising a semi-conductor single crystal serving as a monochromator and a solid state detector for measuring and/or counting the incident x-ray photons of an x-ray beam which enters the semiconductor single crystal, the solid state detector being disposed integrally with the semiconductor perfect single crystal on a side opposite to an x-ray beam incident side thereof disposed, (c) a first driving means for rotating the first x-ray monochromator, (d) a second driving means for rotating the second x-ray monochromator, and (d) a control means for differentiating signals from the solid state detector, and controlling the second driving means to locate the second x-ray monochromator at a rotated position where the differential coefficient obtained by the differentiation changes from a positive value to a negative value, and the intensity of the x-ray beam which enters the second x-ray monochromator is maximized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the x-ray monochromator according to the present invention, either a channel-cut monochromator-crystal or a single monochromator-crystal can be employed. It is preferable that the thickness of a crystal layer of a single crystal portion which serves as the x-ray monochromator be greater than the extinction distance of an x-ray beam to be produced.

The previously mentioned solid state detector (SSD) for use in the x-ray monochromator of the present invention may be composed of an intrinsic semiconductor crystal layer which is monolithic and integral with the crystal, a pair of an n-type or n+-type semiconductor layer and a p-type or p+-type semiconductor, between which the intrinsic semi-conductor crystal layer is sandwiched, an electrode provided on the n-type or n+-type semiconductor layer, an electrode provided on the p-type or p+-type semiconductor, and wires for obtaining signals from these electrodes. One or more solid state detectors of this structure may be used in combination.

With reference to the accompanying drawings, the present invention will now be explained in more detail.

Figure 1:
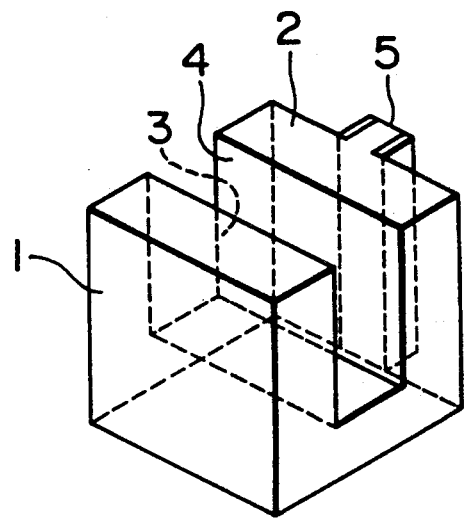
FIG. 1 is a perspective view of an example of an x-ray monochromator according to the present invention.
Figure 2:
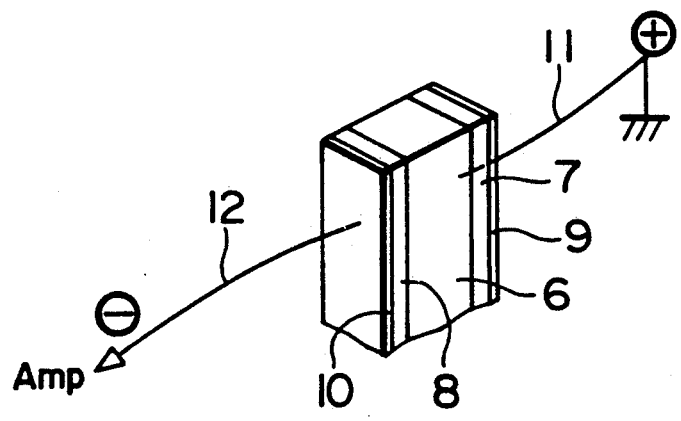
FIG. 2 is an enlarged perspective view of a solid state detector (SSD) for use in the x-ray monochromator shown in FIG. 1.

FIG. 1 is a schematic perspective view of an example of an x-ray monochromator of the present invention. FIG. 2 is an enlarged perspective view of a solid state detector which is provided on a side opposite to an x-ray beam incident side of the channel-cut monochromator-crystal as shown in FIG. 2.

The x-ray monochromator comprises a U-shaped channel-cut monochromator-crystal made of a perfect crystal of, for instance, a non-doped Si or Ge, as shown in FIG. 1. In the x-ray monochromator using such a channel-cut monochromator-crystal, a first light-reflecting portion and a second light-reflecting portion are made of a monolithic crystal. Therefore, an x-ray beam subjected to Bragg reflection at the first light-reflecting portion is also subjected in its entirety, including dispersed light components, to Bragg reflection at the second light-reflecting portion, and the incident x-ray beam is advantageously made parallel to the reflected x-ray beam.

More specifically, in FIG. 1, reference numeral 1 indicates a light-receiving crystal wall; reference numeral 2, a light-reflecting crystal wall; reference numeral 3, a first light-reflecting surface of the light-receiving wall 1; reference numeral 4, a second light-reflecting surface of the second light-reflecting crystal wall 2. The two light-reflecting surfaces 3 and 4 are parallel in this example. However, when a non-parallel reflection is utilized, the two light-reflecting surfaces 3 and 4 can be non-parallel. A solid state detector (SSD) 5 is integrally provided on an external surface of the light-reflecting wall 2 on a side opposite to the light-reflecting surface 4.

The solid state detector 5 will now be explained with reference to FIG. 2. A narrow beam-shaped portion 6 having a rectangular cross section is formed extending in a vertical direction on the external surface of the light-reflecting wall 2. The narrow beam-shaped portion 6 is made of an intrinsic semiconductor crystal which can be formed with a thickness of about 5 mm by dicing or etching. On one side of the beam-shaped portion 6, a thin n-type semiconductor layer 7 is provided, and on the other side of the beam-shaped portion 6, a thin p-type semiconductor layer 8 is provided. On the n-type semiconductor layer 7 and the p-type semiconductor 8, an electrode 9 and an electrode 10 are respectively provided, to which wires 11 and 12 are respectively connected for obtaining signals therefrom. The positions of the n-type semiconductor layer 7 and the p-type semiconductor 8 may be reversed.

It is supposed that an x-ray beam incident on the first light-reflecting surface 3 has a wavelength $\lambda$, a reflection index of (111), a (111) net plane spacing of d(111), and an angle $\theta$ which is formed between the x-ray beam and the (111) plane. If the relationship, $2d(111) \sin \theta = \lambda$, is satisfied in the above case, the incident x-ray beam is subjected to Bragg reflection by the first light-reflecting surface 3 and is caused to travel toward the second light-reflecting surface 4, and one part of the reflected x-ray beam incident on the second light-reflecting surface 4 penetrates the light-reflecting wall 2 and the other part of the reflected x-ray beam is further subjected to Bragg reflection by the second light-reflecting surface 4. The x-ray beam subjected to the Bragg reflection by the second light-reflecting surface 4 serves as an output of the x-ray monochromator of the present invention, while the x-ray beam which penetrates the light-reflecting wall 2 further enters the solid state detector 5 with the above-mentioned structure. At this moment, the solid state detector 5 is biased in a reverse direction with respect to the injection thereof, so that a number of pulses corresponding to the number of the electron-hole pairs generated by the incident x-ray photons are detected across the electrodes 9 and 10. When the thickness of the crystal layer serving as a monochromator at the second light-reflecting surface 4 is set greater than the extinction distance of the x-ray beam, which is determined by the scattering amplitude of the reflected x-ray beam, the so-called structure factor F (h, k, l), which is the reflection index thereof and is generally in the range of several microns to several tens of microns, the intensity of the x-ray photon flux reflected by the second light-reflecting surface 4 is maximized, so that the installment of the solid state detector 5 has no adverse effects on the reflection efficiency of the second light-reflecting surface 4. Furthermore, the intensity of the x-ray photon flux reflected by the second light-reflecting surface 4 is proportional to the intensity of the x-ray photon flux detected by the solid state detector 5.

In addition, when the x-ray monochromator of the present invention is employed, a most appropriate configuration of the light receiving wall 1 at which the intensity of the x-ray photon flux reflected thereby is maximized can be determined by the output from the solid state detector 5, so that a self-tracking monochromator can be provided.

Figure 3:
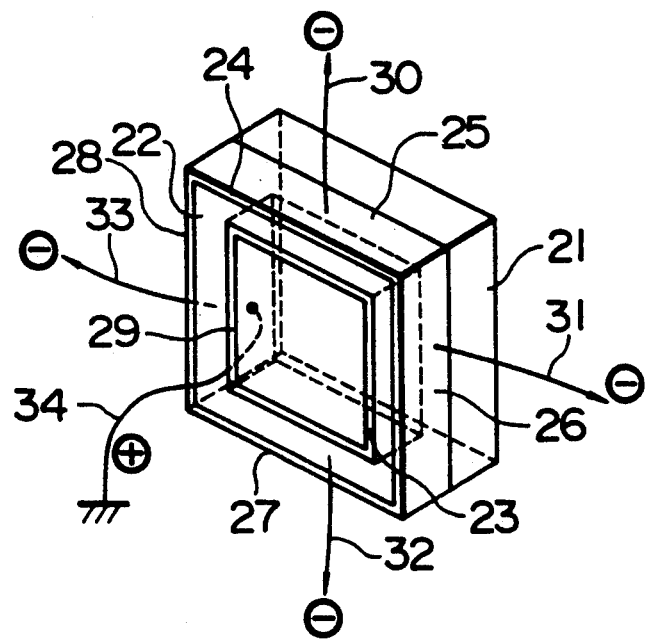
FIG. 3 is a perspective view of another example of a solid state detector (SSD) for use in an x-ray monochromator according to the present invention.

Another example of an x-ray monochromator according to the present invention will now be explained with reference to FIG. 3, which is a perspective view of an x-ray detection portion of a channel-cut type x-ray monochromator.

This x-ray monochromator comprises a single perfect crystal, for example, a single perfect crystal of a non-doped Si or Ge. In this x-ray monochromator, the thickness of a crystal layer 21 is made substantially greater than the extinction distance of the x-ray beam. A solid state detector is disposed on the back side of the crystal layer 21. The solid state detector comprises an intrinsic semiconductor crystal layer 22, an n-type semiconductor layer 23 disposed inside the intrinsic semiconductor layer 22, and a p-type semiconductor layer 24 disposed on the outer peripheral surface of the intrinsic semiconductor crystal layer 22. Electrode layers 25 to 28 made of, for example, Au, are separately disposed on the p-type semi-conductor layer 24, and a common electrode layer 29 is disposed on the inside of the n-type semiconductor layer 23. Wires 30 to 33 for outputting signals are respectively connected to the electrode layers 25 to 28, and a wire 34 is connected to the common electrode layer 29. X-ray intensity signals obtained from each x-ray monochromator are subjected to a comparative operation, and the results of the comparative operation are utilized for the control of the posture of the monochromator. In the above x-ray monochromator, the positional relationship between the n-type semiconductor layer 23 and the p-type semiconductor layer 24 may be reversed. The n-type semiconductor layer 23 and the p-type semiconductor layer 24 can be formed by a planar technique such as ion implantation. The shape of the solid state detector is not necessarily restricted to the above shape.

In x-ray monochromator according to the present invention, the solid state detector for measuring or counting x-ray photons incident on the semiconductor monochromator single crystal is integrally disposed within the semiconductor monochromator single crystal, so that the following advantages over the conventional x-ray monochromator can be attained:

(1) Since the most appropriate posture of the monochromator crystal which constitutes the x-ray monochromator according to the present invention can be detected by the monochromator crystal itself, a high precision monochromator which can be used for the structural analysis and evaluation of thin layers, and for the in situ inspection thereof, which requires extremely high resolution in terms of space and energy, such as the XANES measurement method and total reflection method, can be obtained. Conventionally, the posture of the monochromator-crystal is adjusted by while receiving an x-ray beam, so that exposure of the operator to the x-ray beam is inevitable, thus this operation is very risky. Moreover this adjustment needs delicate care and patience. In contrast, this adjustment according to the present invention can be automatically carried out. This can accomodate the recent keen demand for the technique for the structure evaluation and control of thin films and ultra-thin-film devices.

(2) When two channel-cut type monochromators with the (+, +) settings are employed, since an x-ray beam which has passed through the first channel-cut monochromator passes through the second channel-cut type monochromator, almost no wavelength dispersion takes place, so that a highly parallel x-ray beam with extremely high resolution can be attained.

(3) By setting the thickness of the monochromator crystal layer thicker than the extinction distance of the x-ray beam, the intensity of the x-ray beam can be maximized to its saturation value, and the solid state detector which is monolithically incorporated within the monochromator crystal layer has no effects on the reflection efficiency. Furthermore, since the intensity of the x-ray beam produced by the x-ray monochromator is parallel to that monitored by the solid state detector, the synchronization accuracy of the monochromators can be significantly improved.

(4) When the solid state detector is constructed of a plurality of solid state detector devices, more accurate posture of the x-ray monochromator can be determined by subjecting the detection signals from the solid state detector devices to a comparative operation.

In the present invention, a scintillation detector, a photodiode and an ionization chamber can be employed instead of the solid state detector to detect the x-ray beam.

A spectral measurement apparatus for measuring the structure of a specimen with application of an x-ray beam and measuring the absorption of the x-ray beam by the specimen or the reflection of the x-ray beam from the specimen according to the present invention comprises (a) a first x-ray monochromator comprising a U-shaped perfect single crystal, (b) at least one second x-ray monochromator, which is identical to the above mentioned x-ray monochromator, and comprises a semiconductor perfect single crystal serving as a monochromator and a solid state detector for measuring and-/or counting the incident x-ray photons of an x-ray beam which enters the semiconductor single crystal, the solid state detector being integrally disposed with the semiconductor perfect single crystal on a side opposite to an x-ray incident side thereof, (c) a first driving means for rotating the first x-ray monochromator, (d) a second driving means for rotating the second x-ray monochromator, and (d) a control means for differentiating signals from the solid state detector and controlling said second driving means to locate the second x-ray monochromator at a rotated position where the differential coefficient obtained by the differentiation changes from a positive value to a negative value, and the intensity of the x-ray beam which enters second x-ray monochromator is maximized.

More specifically, in the spectral measurement apparatus according to the present invention, the U-shaped perfect single crystal of the first x-ray monochromator may be a channel-out monochromator-crystal, and the semiconductor single crystal of the second x-ray monochromator may be a channel-cut monochromator-crystal. The solid state detector is integrally or monolithically provided on the external side of a light-reflecting wall of the channel-cut monochromator-crystal, or inside the light-reflecting wall of the second channel-cut monochromator crystal. The first driving means for rotating the first x-ray monochromator may be a first pulse motor for rotating a turn table on which the above-mentioned first x-ray monochromator is placed. The second driving means for rotating the second x-ray monochromator may be a second pulse motor for rotating a turn table on which the above-mentioned second x-ray monochromator is placed. The control means differentiates signals form the solid state detector, and controls the second pulse motor to locate the second x-ray monochromator at a rotated position where the differential coefficient obtained by the differentiation changes from a positive value to a negative value, and the intensity of the x-ray beam which enters second x-ray monochromator is maximized.

In the spectral measurement apparatus, the first turn table is rotated to a predetermined angle by the first pulse motor, and the second turn table is then rotated, keeping track of the rotation of the first turn table by the second pulse motor. At this moment, the solid state detector detects the intensity of the x-ray photon flux which penetrates the light-reflecting wall of the second channel-cut monochromator crystal to produce a detecting signal. The control means differentiates the detecting signal with respect to the angle to obtain a differential coefficient and automatically controls the drive of the second pulse motor while monitoring the differential coefficient. At the moment the differential coefficient changes from a negative value to a positive value, the drive of the second pulse motor is stopped. At the above moment, each of the first and second channel-cut monochromator-crystals is in an anti-symmetric position. Thus, the posture of each of the first and second channel-cut monochromator-crystals is accurately determined, so that a highly parallel and monochromator x-ray beam with high energy resolution can be obtained without decreasing the intensity thereof.

Figure 4:
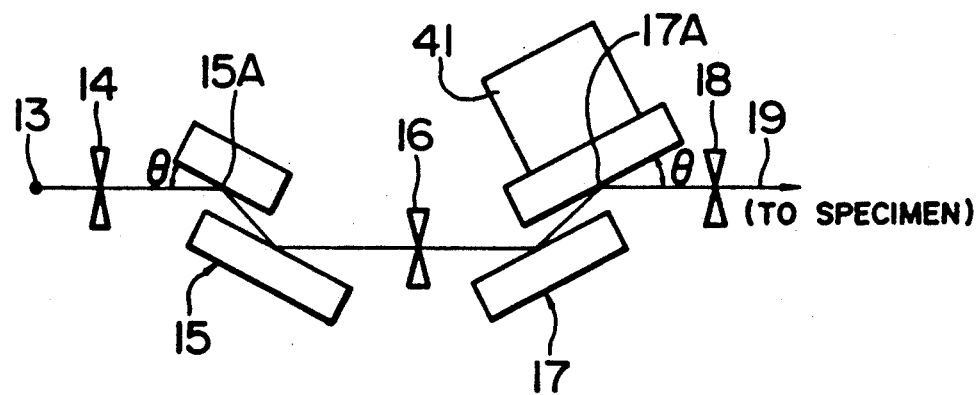
FIG. 4 is a schematic diagram of an example of a spectral measurement apparatus according to the present invention.
Figure 5:
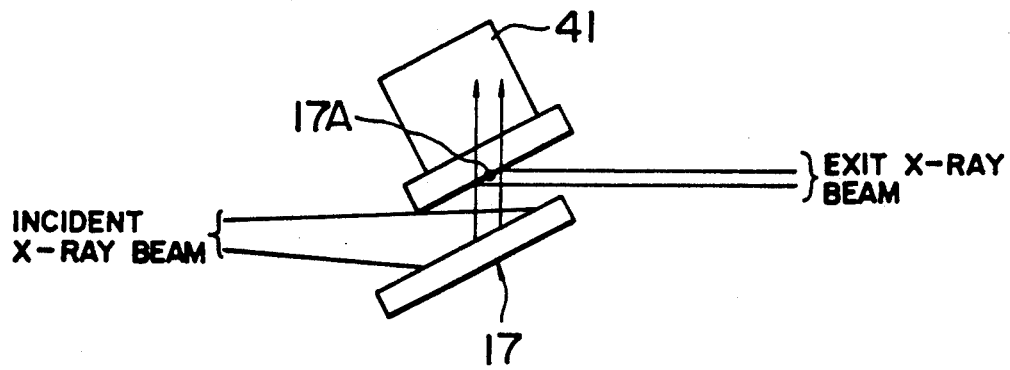
FIG. 5 is a schematic illustration in explanation of the operation principle of the second channel-cut monochromator-crystal provided with a solid state detector, with the (+,+) setting with respect to the first channel-cut monochromator-crystal (not shown) of the present invention.
Figure 6:
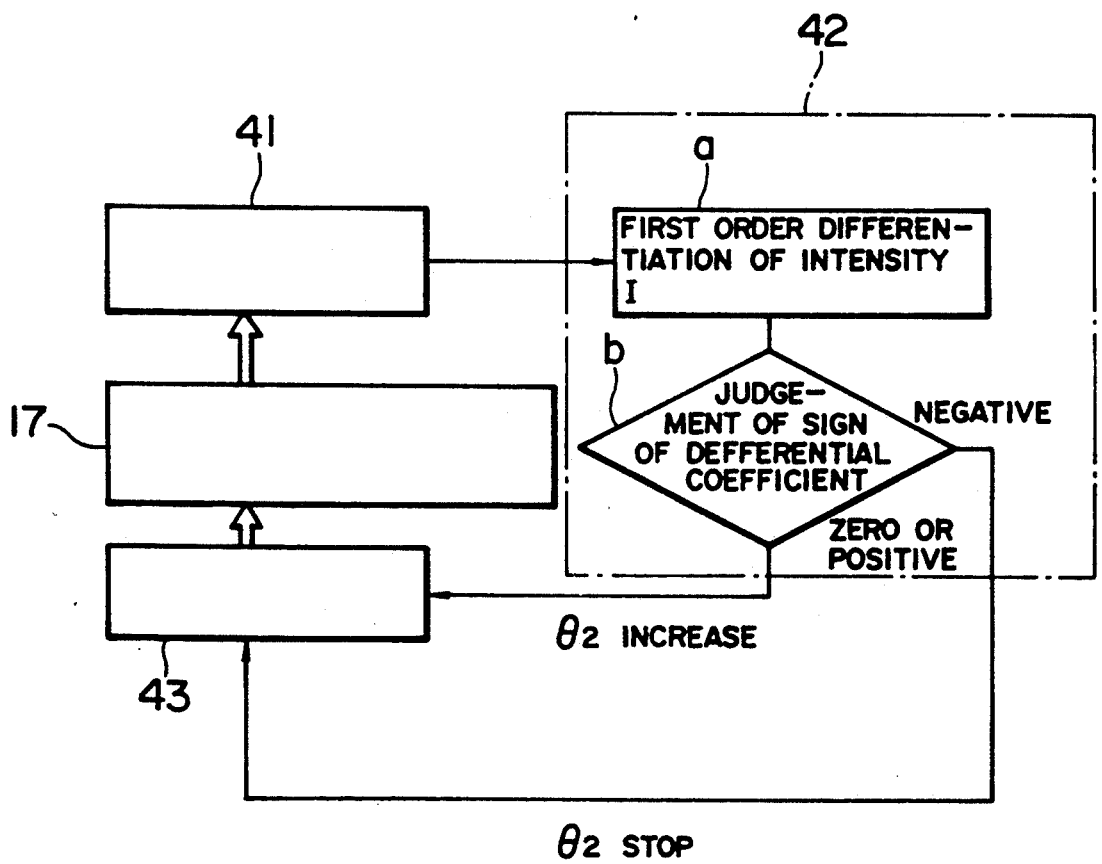
FIG. 6 is a block diagram for explaining the operation of the solid state detector and the drive mechanism shown in FIG. 5.

FIG. 4 is a schematic diagram of a spectral measurement apparatus according to the present invention. In the figure, reference numeral 13 indicates a white x-ray beam source; reference numerals 14, 16 and 18, first, second and third slits, respectively; reference numeral 15, a first channel-cut monochromator; reference numeral 15A, the axis of rotation of the first channel-cut monochromator 15; reference numeral 17, a second channel-cut monochromator; reference numeral 17A, the axis of rotation of the second channel-cut monochromator; and reference numeral 19, an exit x-ray beam. The first and second channel-cut monochromators 15 and 17 are capable of rotating in mutual synchronization in an anti-symmetric direction by a drive mechanism which will be described later. The first and second channel-cut mono-chromators 15 and 17 can be made by cutting, for instance, a non-doped Si perfect crystal. In this example, they are positioned with the (+, +) setting.

The white x-ray flux emitted from the white x-ray beam source 13 is converted into an x-ray beam by the first slit 14, and caused to impinge on the crystal surface including the axis of rotation 15A of the first channel-cut monochromator 15. When the reflection index utilized in the first channel-cut monochromator 15 is, for instance, (111), and the visual angle formed between the x-ray beam incident on the (111) plane and the (111) plane is $\theta$, an x-ray beam with a wavelength of $\lambda$, which satisfies the relationship, $2d(111) \sin \theta = \lambda$, where $d(111)$ is the net plane spacing of the (111) plane, is caused to exit from the first channel-cut monochromator-crystal 15 onto the second channel-cut monochromator 17 via the second slit 16. At this moment, the second channel-cut monochromator-crystal 17 receives an x-ray beam with a wavelength dispersion rate of $\Delta\lambda/\lambda = \Delta d/d + \Delta\theta \cot \theta$, where $\Delta d/d$ indicates the scattering resulting from the imperfectness of the crystal, and $\Delta\theta$ indicates the angular divergence in the parallelism of the x-ray beam incident on the first channel-cut monochromator 15. The second channel-cut monochromator 17 serves to produce a highly parallel and monochromatic x-ray beam with a reflection in the parallelism of about $\Delta\theta = (\Delta d/d)[\tan \theta/2]$. Because of this, the magnitude of $\Delta\theta$ is in the order of $1/10^4$. Thus a spectral measurement apparatus with a monochromator with high resolution and high efficiency can be obtained. A solid sate detector 41 is provided integrally with the second channel-cut monochromator 17 on a side opposite to an x-ray beam incident side thereof.

With reference to FIG. 4 to FIG. 7, a drive mechanism by which the first channel-cut monochromator 15 and the second channel-cut monochromator 17 are driven in an anti-symmetric rotation will now be explained.

In this drive mechanism, a first turn table on which the first channel-cut monochromator crystal 15 is placed, and a second turn table on which the second channel-cut monochromator crystal 17 is placed are respectively rotated by a first pulse motor and a second pulse motor. The solid state detector 41 for detecting the intensity of an x-ray flux which has passed through the light-reflecting crystal wall is disposed inside or on the back side of the light-reflecting crystal wall, and the second pulse motor 43 which rotates the second turn table is controlled in accordance with a signal which is obtained by monitoring the output signal from the solid state detector 41 by a control circuit 42.

More specifically, the first channel-cut monochromator crystal 15 placed on the first turn table is rotated to a predetermined angle by the first pulse motor. The second channel-cut momochromator 17 placed on the second turn table is anti-symmetrically rotated in the direction opposite to the rotation of the first channel-cut monochromator crystal 15 by the same angle as that for the first channel-cut monochromator crystal 15, while tracking the rotation of the first channel-cut monochromator crystal 15.

Figure 7:
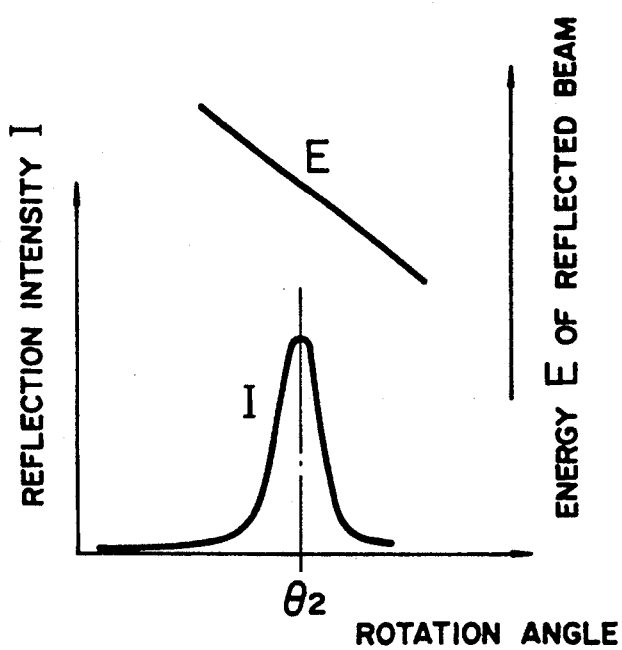
FIG. 7 is a graph showing the relationship between a rotation angle $\theta_2$ of a second channel-cut monochromator-crystal when rotated a slight degree in the direction opposite to the rotation of a first channel-cut monochromator-crystal which is rotated a predetermined angle, and the reflection intensity I from the second channel-cut monochromator-crystal, and the relationship between the rotation angle $\theta_2$ and the energy E of the reflected x-ray beam from the second channel-cut monochromator crystal.

FIG. 7 shows the reflection intensity I and the reflection energy E in the second channel-cut monochromator crystal 17 when the first channel-cut monochromator crystal 15 is first rotated by a certain degree and the second channel-cut monochromator crystal 17 is rotated in the direction opposite to the rotation of the first channel-cut monochromator crystal by an angle $\theta_2$. The reflection intensity I is maximized when the second channel-cut monochromator 17 is rotated by the same angle as that for the rotation of the first channel-cut monochromator 15. Therefore, the value of the x-ray intensity detected by the solid state detector 41 is differentiated, and the defferential coefficient is monitored. The drive of the second pulse motor 43 is controlled in accordance with the monitored differential coefficient, whereby the rotated positions of the first channel-cut monochromator crystal 15 and the second channel-cut monochromator crystal 17 can be accurately set. For this purpose, the control circuit 42 must be provided with at least the function of obtaining a differential coefficient by differentiating the output of the x-ray intensity detected by the solid state detector 41 (function a, first order differentiation, in FIG. 6), and the function of judging the sign (positive, zero, or negative) of the differential coefficient obtained by the above function a, outputting a drive signal to the second pulse motor 43 to increase the angle $\theta_2$ when the sign is positive or zero, and outputting a termination signal to the second pulse motor 43 when the sign of the differential coefficient becomes negative.

In the above example according to the present invention, the two channel-cut monochromator-crystals are rotated in mutual synchronization in an anti-symmetric direction, so that a highly parallel and monochromatic x-ray beam with high energy resolution can be obtained without the intensity thereof being decreased. The synchronization is automatic and the accuracy thereof is as low as about 1 second.

What is claimed is:

1. An x-ray monochromator comprising a semiconductor perfect single crystal serving as a monochromator and a solid state detector for measuring and/or counting the incident x-ray photons of an x-ray beam which enters the semiconductor single crystal, said solid state detector being disposed integrally with said semiconductor perfect single crystal on a side opposite to an x-ray beam incident side thereof.

2. The x-ray monochromator as claimed in claim 1, wherein said semiconductor perfect single crystal is a single monochromator crystal.

3. The x-ray monochromator as claimed in claim 1, wherein said semiconductor perfect single crystal is a channel-cut monochromator crystal.

4. The x-ray monochromator as claimed in claim 1, wherein the thickness of a monochromator portion of said semiconductor perfect single crystal is greater than the extinction distance of said x-ray beam.

5. The x-ray monochromator as claimed in claim 1, wherein said solid state detector is disposed inside said semiconductor perfect single crystal on a side opposite to an x-ray beam entering side thereof.

6. The x-ray monochromator as claimed in claim 1, wherein said solid state detector is disposed behind said semiconductor perfect single crystal on a side opposite to an x-ray beam entering side thereof.

7. The x-ray monochromator as claimed in claim 1, wherein said solid state detector comprises at least one solid state detector device comprising an intrinsic semiconductor crystal layer which is monolithic with said semiconductor perfect single crystal, an n-type semiconductor layer and a p-type semiconductor layer between which said intrinsic semiconductor crystal layer is sandwiched, an electrode provided on said n-type semi-conductor layer, an electrode provided on said p-type semiconductor layer, and lead wires connected to each of said electrodes.

8. The x-ray monochromator as claimed in claim 5, wherein said solid state detector comprises at least one solid state detector device comprising an intrinsic semiconductor crystal layer which is monolithic with said semiconductor perfect single crystal, an n-type semiconductor layer and a p-type semiconductor layer between which said intrinsic semiconductor crystal layer is sandwiched, an electrode provided on said n-type semi-conductor layer, an electrode provided on said p-type semiconductor layer, and lead wires connected to each of said electrodes.

9. The x-ray monochromator as claimed in claim 6, wherein said solid state detector comprises at least one solid state detector device comprising an intrinsic semiconductor crystal layer which is monolithic with said semiconductor perfect single crystal, an n-type semiconductor layer and a p-type semiconductor layer between which said intrinsic semiconductor crystal layer is sandwiched, an electrode provided on said n-type semi-conductor layer, an electrode provided on said p-type semiconductor layer, and lead wires connected to each of said electrodes.

10. A spectral measurement apparatus for measuring the structure of a specimen with application of an x-ray beam and measuring the absorption of the x-ray beam by the specimen of the reflection of the ray-ray beam from the specimen comprising (a) a first x-ray monochromator comprising a U-shaped perfect single crystal, (b) at least one second x-ray monochromator comprising a semiconductor perfect single crystal serving as a monochromator and a solid state detector for measuring and/or counting the incident x-ray photons of an x-ray beam which enters the semiconductor single crystal, said solid state detector being disposed integrally with said semiconductor perfect single crystal on a side opposite to an x-ray beam incident side thereof, (c) a first driving means for rotating the first x-ray monochromator, (d) a second driving means for rotating the second x-ray monochromator, and (d) a control means for differentiating signals from the solid state detector, and controlling said second driving means to locate the second x-ray monochromator at a rotated position where the differential coefficient obtained by the differentiation changes from a positive value to a negative value, and the intensity of the x-ray beam which enters second x-ray monochromator is maximized.

11. The spectral measurement apparatus as claimed in claim 10, wherein said semiconductor perfect single crystal of said second x-ray monochromator is a single monochromator crystal.

12. The spectral measurement apparatus as claimed in claim 10, wherein said semiconductor perfect single crystal of said second x-ray monochromator is a channel-cut monochromator crystal.

13. The spectral measurement apparatus as claimed in claim 10, wherein the thickness of a monochromator portion of said semiconductor perfect single crystal of said second x-ray monochromator is greater than the extinction distance of said x-ray beam.

14. The spectral measurement apparatus as claimed in claim 10, wherein said solid state detector is disposed inside said semiconductor perfect single crystal on a side opposite to an x-ray beam entering side thereof.

15. The spectral measurement apparatus as claimed in claim 10, wherein said solid state detector is disposed behind said semiconductor perfect single crystal on a side opposite to an x-ray beam entering side thereof.

16. The spectral measurement apparatus as claimed in claim 10, wherein said solid state detector comprises at least one solid state detector device comprising an intrinsic semiconductor crystal layer which is monolithic with said semiconductor perfect single crystal, an n-type semiconductor layer and a p-type semiconductor layer between which said intrinsic semiconductor crystal layer is sandwiched, an electrode provided on said n-type semi-conductor layer, an electrode provided on said p-type semiconductor layer, and lead wires connected to each of said electrodes.

17. The semiconductor measurement apparatus as claimed in claim 14, wherein said solid state detector comprises at least one solid state detector device comprising an intrinsic semiconductor crystal layer which is monolithic with said semiconductor perfect single crystal, an n-type semiconductor layer and a p-type semiconductor layer between which said intrinsic semiconductor crystal layer is sandwiched, an electrode provided on said n-type semi-conductor layer, an electrode provided on said p-type semiconductor layer, and lead wires connected to each of said electrodes.

18. The spectral measurement apparatus as claimed in claim 15, wherein said solid state detector comprises at least one solid state detector device comprising an intrinsic semiconductor crystal layer which is monolithic with said semiconductor perfect single crystal, an n-type semiconductor layer and a p-type semiconductor layer between which said intrinsic semiconductor crystal layer is sandwiched, an electrode provided on said n-type semi-conductor layer, an electrode provided on said p-type semiconductor layer, and lead wires connected to each of said electrodes.

19. The spectral measurement apparatus as claimed in claim 1, wherein said U-shaped perfect single crystal of said first x-ray monochromator is a channel-cut monochromator crystal.

* * * * *

UNITED STATES PATENT AND TRADEMARK OFFICE
CERTIFICATE OF CORRECTION

PATENT NO. : 5,199,058
DATED : MARCH 30, 1993
INVENTOR(S) : TANI ET AL

It is certified that error appears in the above-indentified patent and that said Letters Patent is hereby corrected as shown below:

Column 9, line 67, change "of" (first occurrence) to --or--.

Signed and Sealed this

Thirteenth Day of September, 1994

Attest:

BRUCE LEHMAN

*Attesting Officer*  *Commissioner of Patents and Trademarks*